(12) United States Patent
Su

(10) Patent No.: US 7,301,747 B2
(45) Date of Patent: Nov. 27, 2007

(54) VOLTAGE STABILIZING AND SURGE PREVENTING VEHICLE GROUNDING SYSTEM

(76) Inventor: Chih-Yang Su, No. 4-2, Fu-an Village, Houbi Township, Tainan County 731 (TW)

(*) Notice: Subject to any disclaimer, the term of this patent is extended or adjusted under 35 U.S.C. 154(b) by 381 days.

(21) Appl. No.: 11/134,422

(22) Filed: May 23, 2005

(65) Prior Publication Data

US 2006/0262476 A1 Nov. 23, 2006

(51) Int. Cl.
*H02H 1/04* (2006.01)
(52) U.S. Cl. .................................. 361/118; 361/117
(58) Field of Classification Search ............... 361/23, 361/117, 118, 136
See application file for complete search history.

(56) References Cited

U.S. PATENT DOCUMENTS 4,630,163 A * 12/1986 Cooper et al. ............... 361/56

6,385,029 B1 * 5/2002 Pennington ................ 361/111

* cited by examiner

*Primary Examiner*—Michael Sherry
*Assistant Examiner*—Danny Nguyen

(57) ABSTRACT

A voltage stabilizing and surge preventing vehicle grounding system is essentially constructed of a surge absorber, a surge suppresser, and a multi-tapped closed loop grounding wire. The positive terminal of the surge absorber is connected to a first conductor of the surge suppresser, whereas the negative terminal of the surge absorber is connected to the negative terminal of the vehicle generator. A second conductor of the surge suppresser is connected to the positive terminal of the vehicle generator so as to stabilize the output voltage of the generator and prevent the impulse surge from the generator. The grounding wire is formed into a closed loop consisting of a first half side and a second half side, and tapped off from the nodes en route to ground the negative terminals of the component devices of the vehicle along with the chassis so as to minimize the grounding resistance thereby further stabilizing the generator voltage and improving engine efficiency and signal precision of the computer that helps upgrade the response of the mechanical components of the vehicle to the computer signal.

11 Claims, 25 Drawing Sheets

Static state resistance (battery disconnected, engine standing still)

Vehicle type : 1997,TOYOTA,CAMRY,2200CC

Measuring instrument: ESCORT EDA201B multimeter

| Battery disconnected<br>Resistance (Ω) | Generator negative terminal as reference point | | | | | | | |
|---|---|---|---|---|---|---|---|---|
| | To negative terminal of battery | To negative terminal of starting motor | To negative terminal of throttle valve | To negative terminal of gear shift controller | To negative terminal of compressor | To negative terminal of ABS | To negative terminal of engine cover | To negative terminal of chassis (upper end of heat dissipator) |
| Without loop grounding wire | 0.23(Ω) | 0.28(Ω) | 0.25(Ω) | 0.21(Ω) | 0.23(Ω) | 0.29(Ω) | 259.32(Ω) | 0.85(Ω) |
| with loop grounding wire | 0.08(Ω) | 0.16(Ω) | 0.02(Ω) | 0.01(Ω) | 0.01(Ω) | 0.13(Ω) | 0.21(Ω) | 0.13(Ω) |

Attachment 1

Moving state no load voltage wave form:
Vehicle type :1997,TOYOTO,CAMRY,2200CC
Measuring instrument: Agilent 54622D Mixed Signal Oscilloscope

| Engine running (no load) | | Voltage wave form between generator positive terminal and measuring point | | | | | | | | |
|---|---|---|---|---|---|---|---|---|---|---|
| Measurement condition | | To negative terminal of generator (Attachment 3) | To negative terminal of battery (Attachment 4) | To negative terminal of starting motor (Attachment 5) | To negative terminal of throttle valve (Attachment 6) | To negative terminal of gear shift controller (Attachment 7) | To negative terminal of compressor (Attachment 8) | To negative terminal of ABS (Attachment 9) | To negative terminal of engine cover (Attachment 10) | To negative terminal of chassis (upper end of heat dissipator) (Attachment 11) |
| Without loop grounding wire | Idle speed | 0-1-01 | 0-1-02 | 0-1-03 | 0-1-04 | 0-1-05 | 0-1-06 | 0-1-07 | 0-1-08 | 0-1-09 |
| | 2000rpm | 0-2-01 | 0-2-02 | 0-2-03 | 0-2-04 | 0-2-05 | 0-2-06 | 0-2-07 | 0-2-08 | 0-2-09 |
| With loop grounding wire | Idle speed | T-1-01 | T-1-02 | T-1-03 | T-1-04 | T-1-05 | T-1-06 | T-1-07 | T-1-08 | T-1-09 |
| | 2000rpm | T-2-01 | T-2-02 | T-2-03 | T-2-04 | T-2-05 | T-2-06 | T-2-07 | T-2-08 | T-2-09 |

Attachment 2

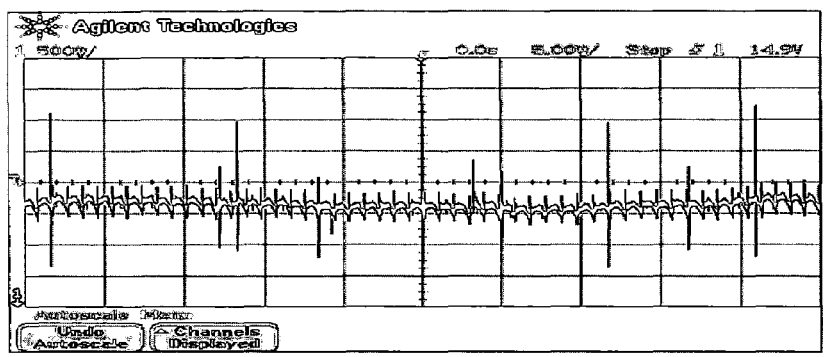
O-1-01
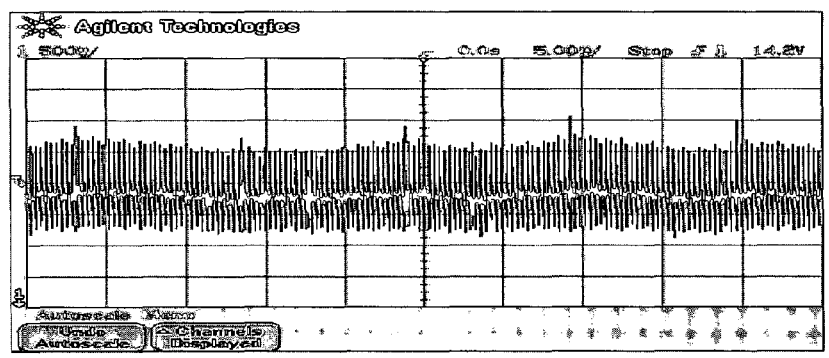
O-2-01
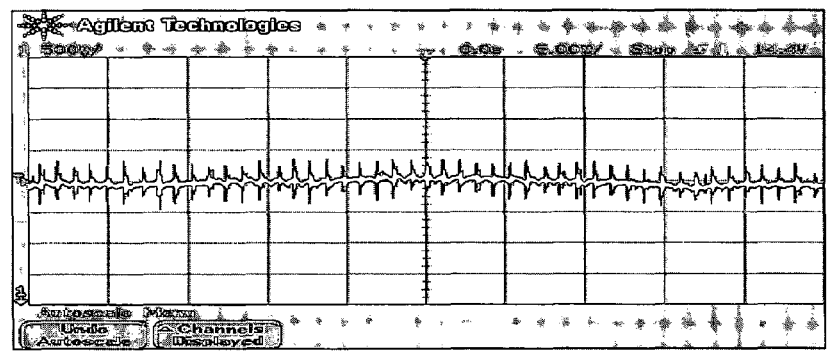
T-1-01
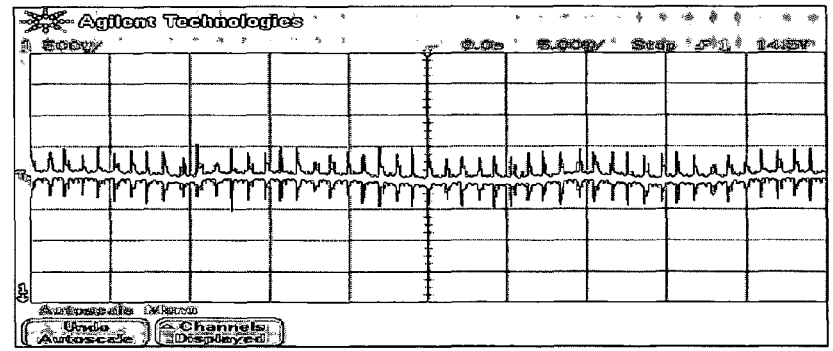
T-2-01
Attachment 3

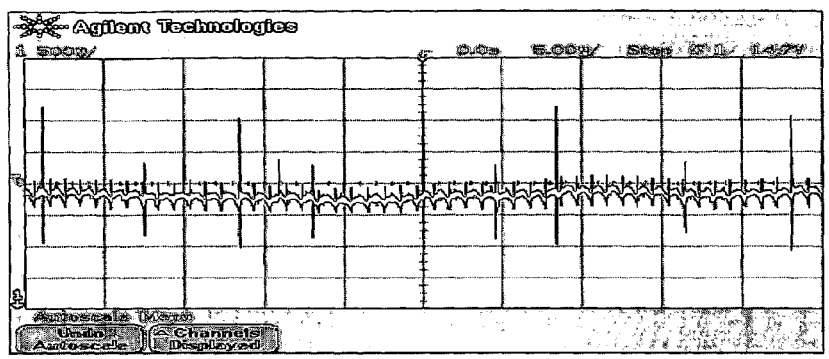
O-1-02
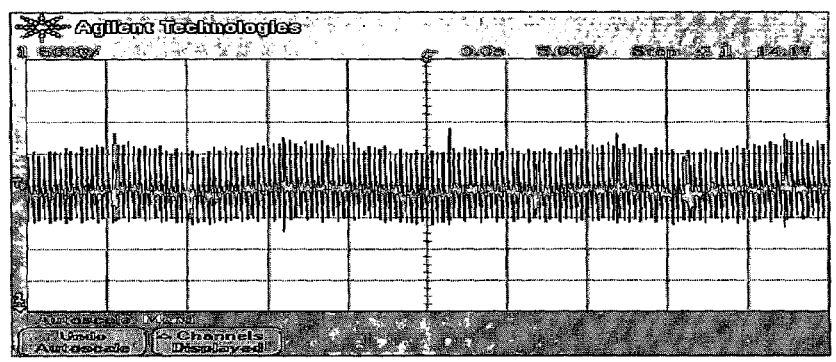
O-2-02
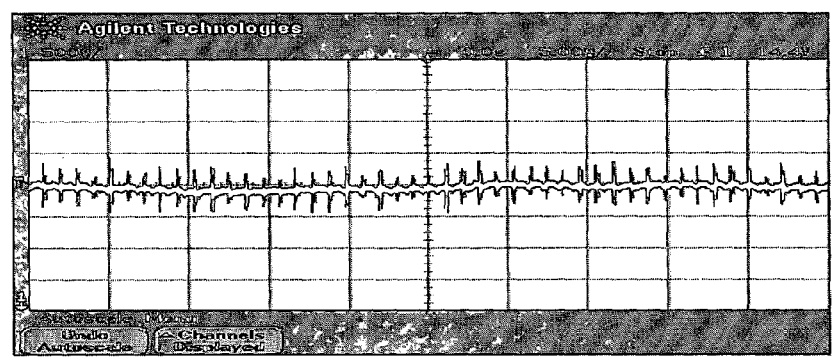
T-1-02
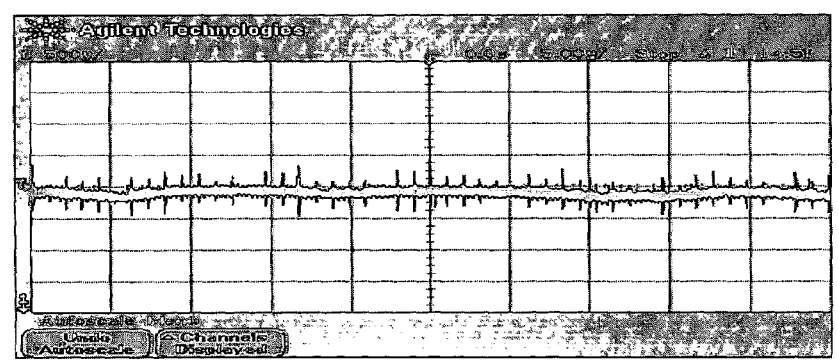
T-2-02
Attachment 4

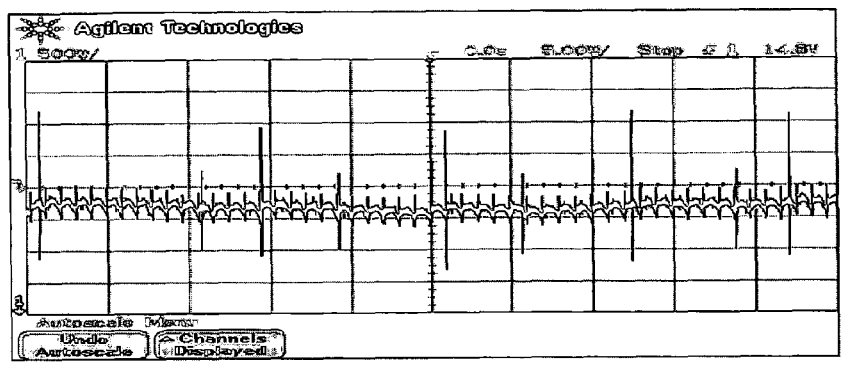
O-1-03
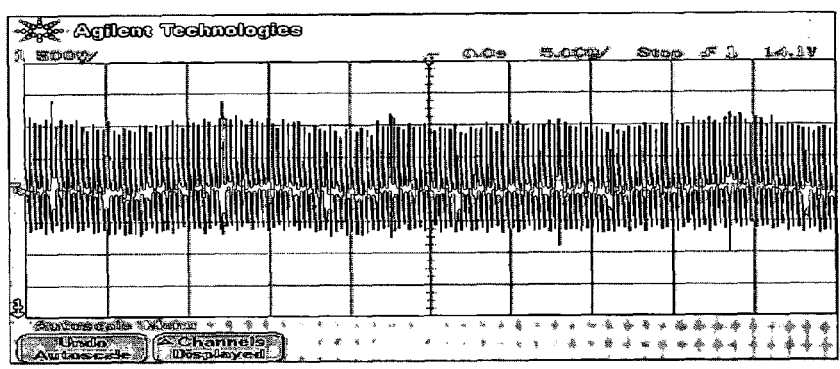
O-2-03
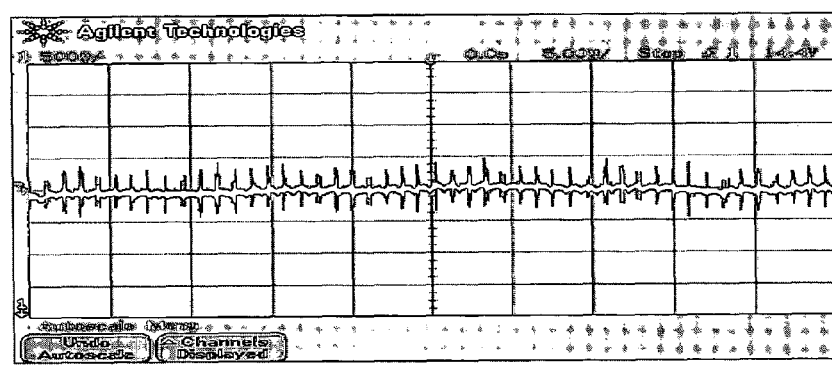
T-1-03
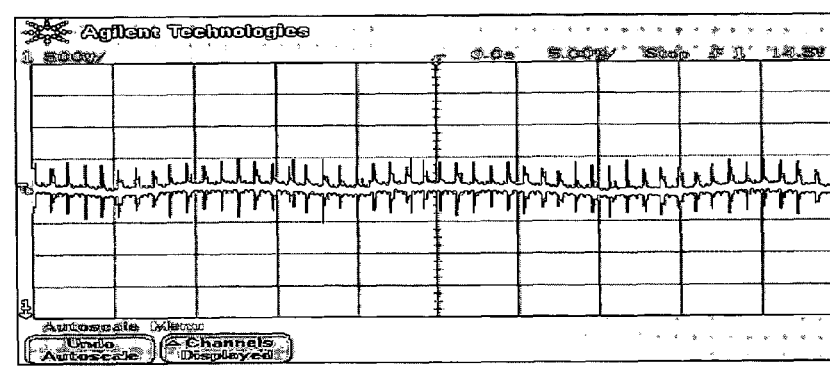
T-2-03
Attachment 5

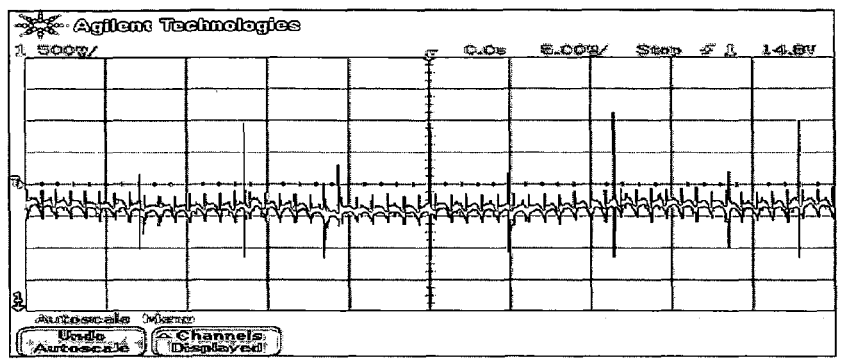
O-1-04
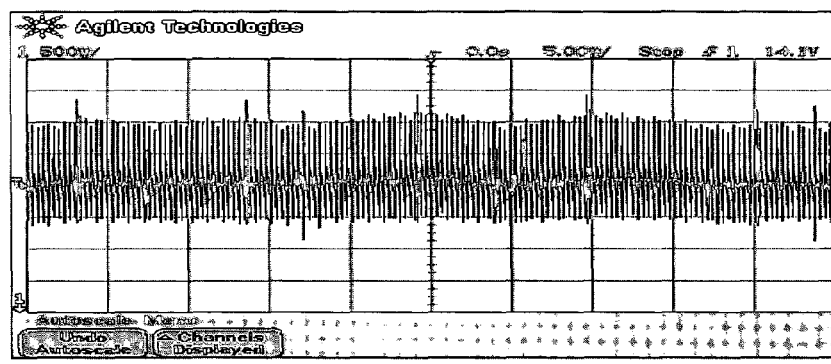
O-2-04
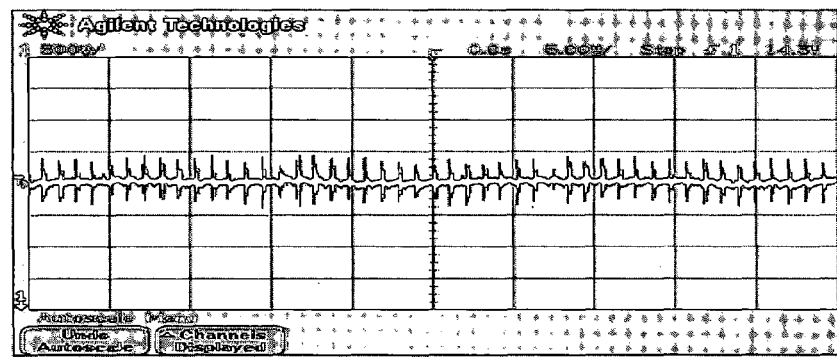
T-1-04
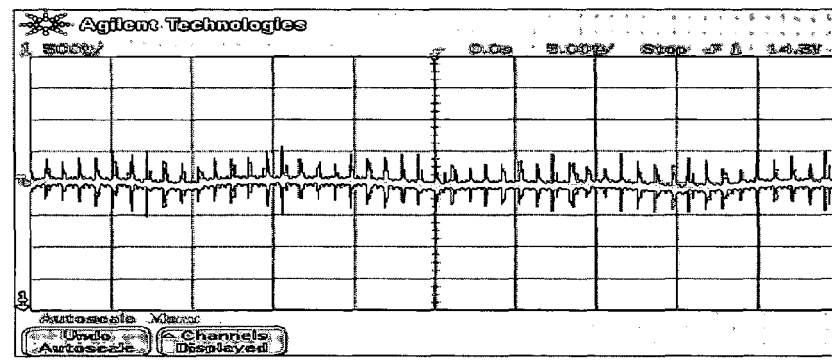
T-2-04
Attachment 6

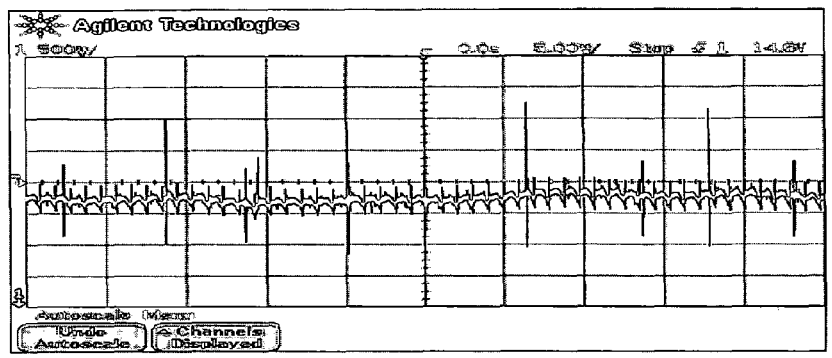
O-1-05
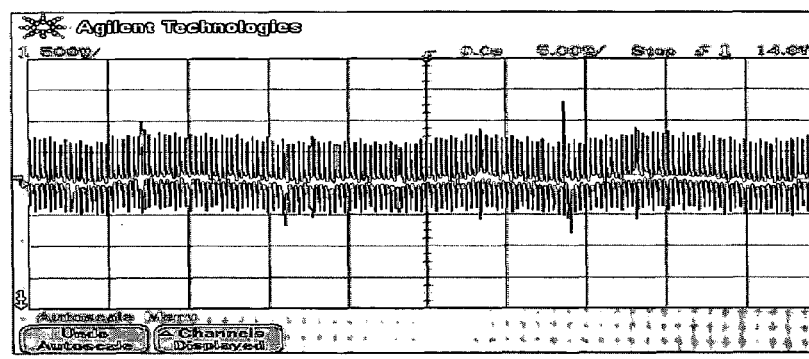
O-2-05
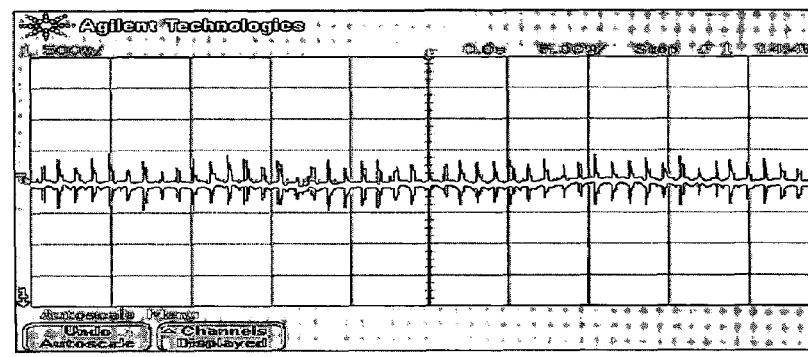
T-1-05
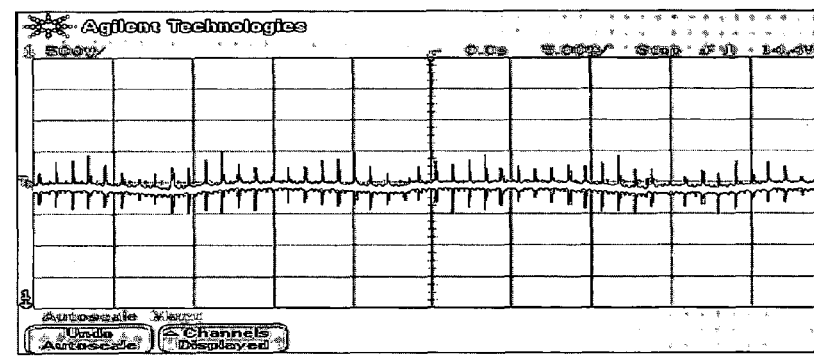
T-2-05
Attachment 7

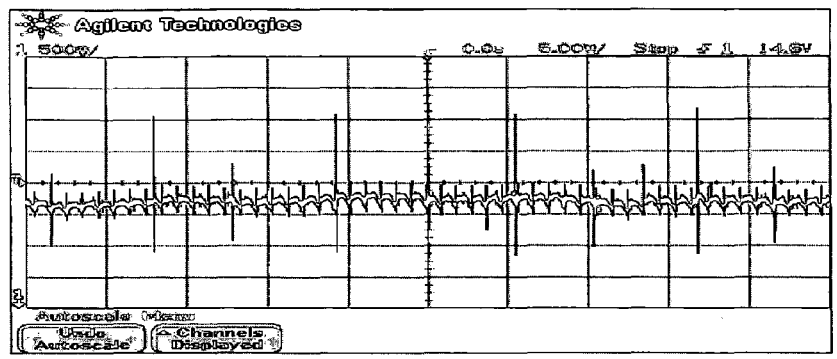
O-1-06
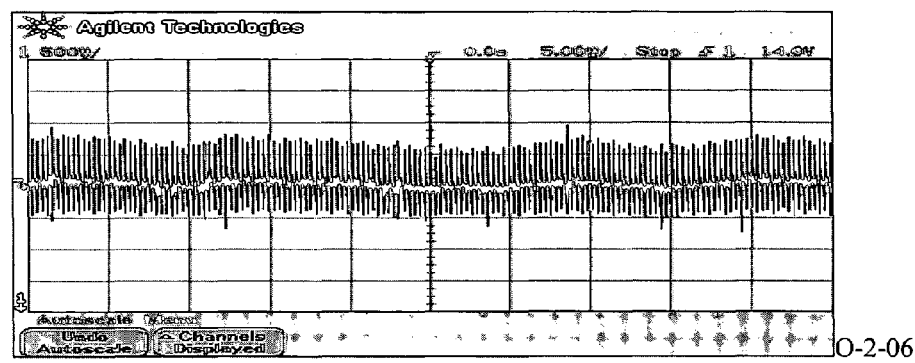
O-2-06
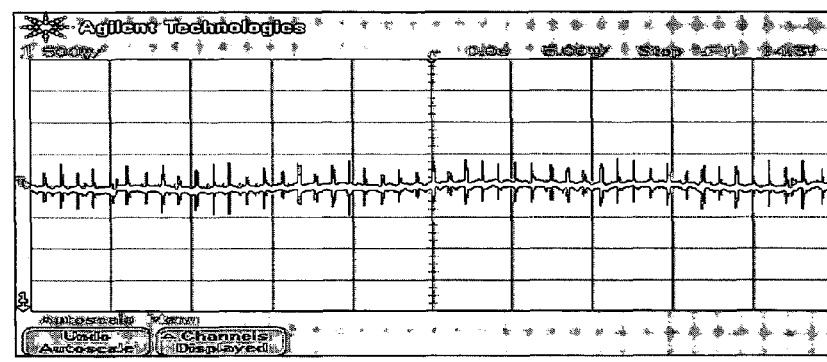
T-1-06
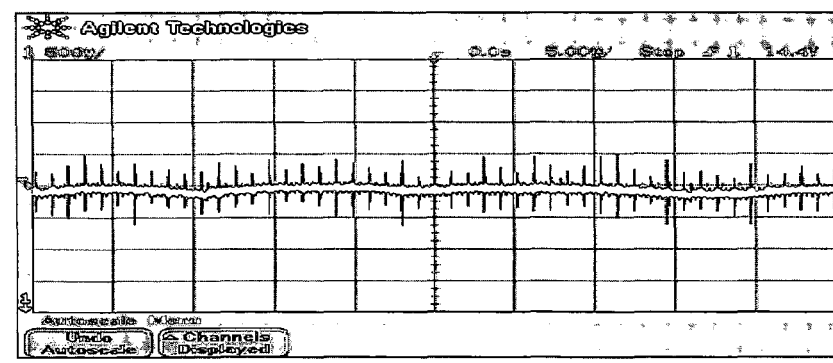
T-2-06
Attachment 8

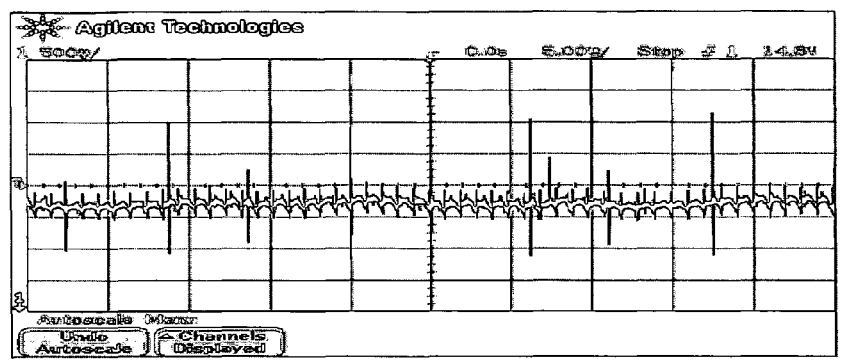
O-1-07
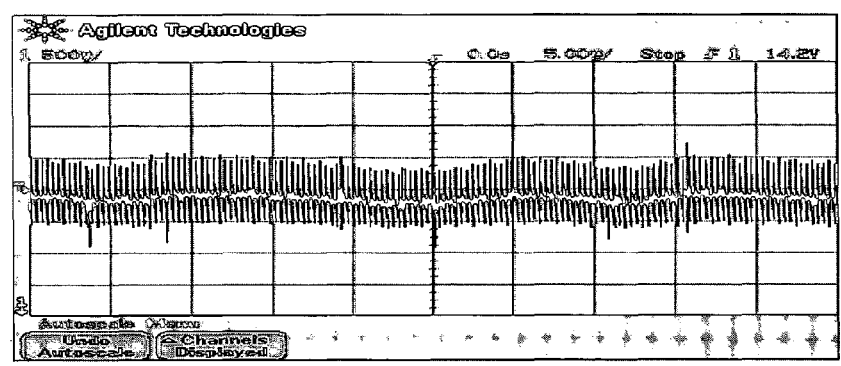
O-2-07
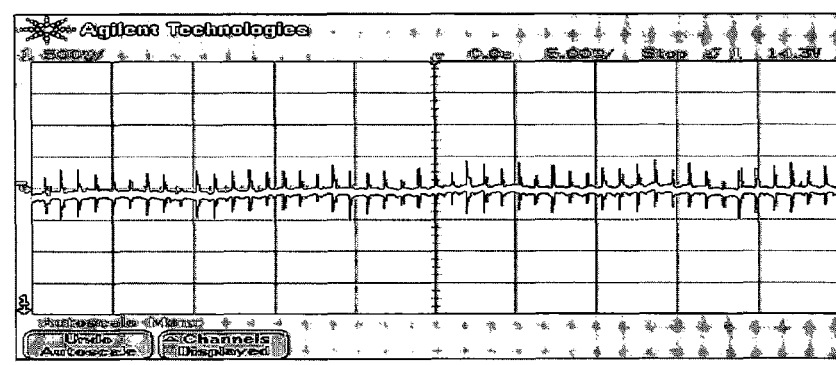
T-1-07
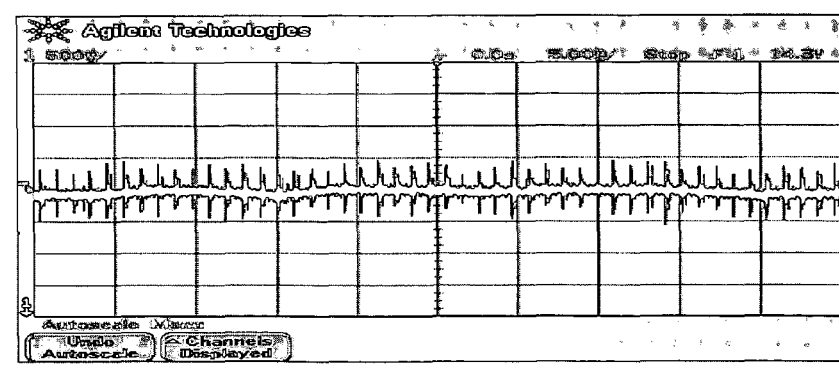
T-2-07
Attachment 9

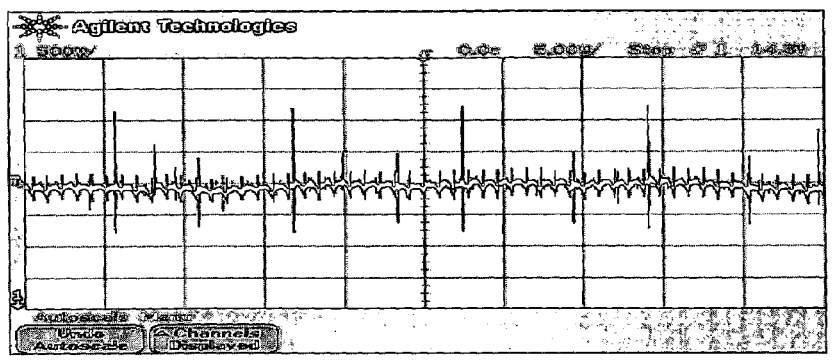
O-1-08
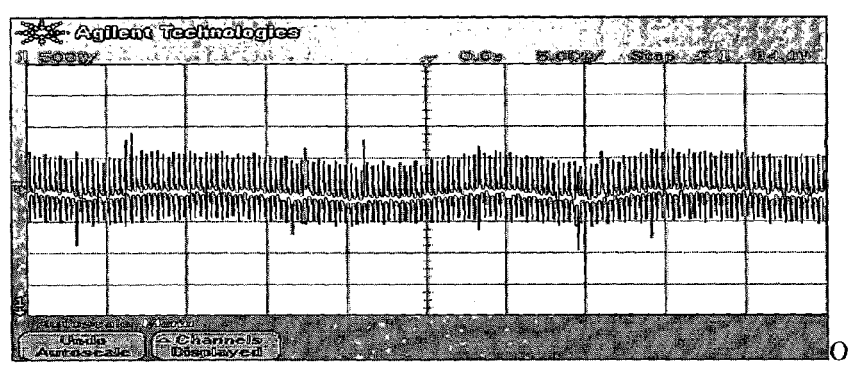
O-2-08
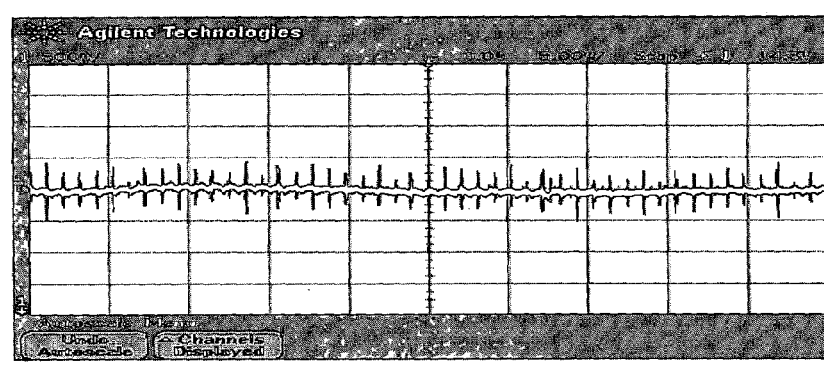
T-1-08
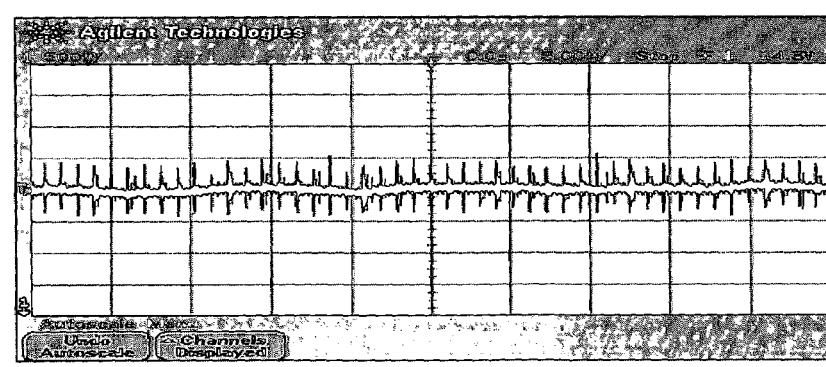
T-2-08
Attachment 10

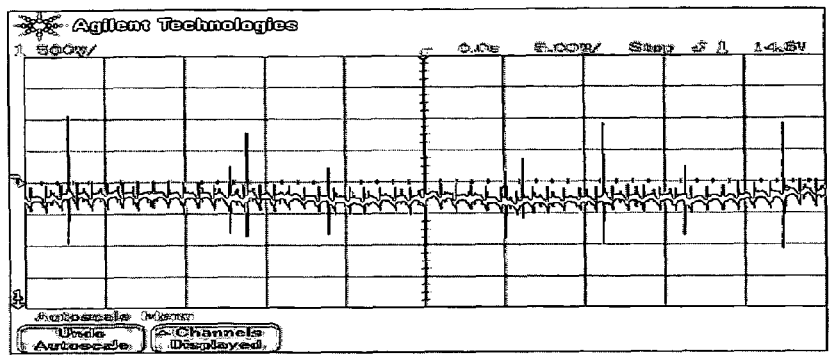
O-1-09
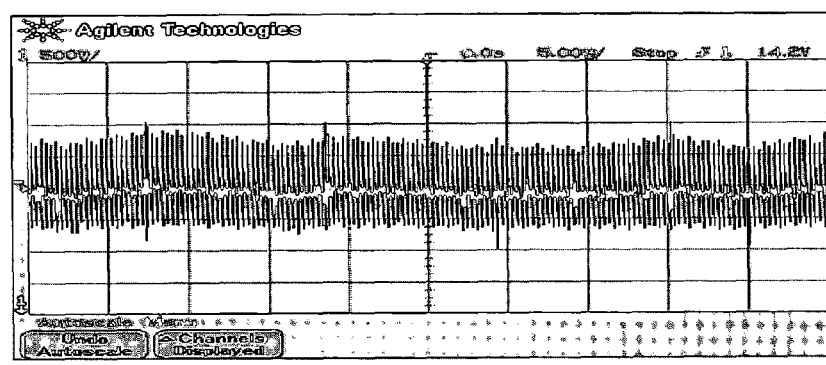
O-2-09
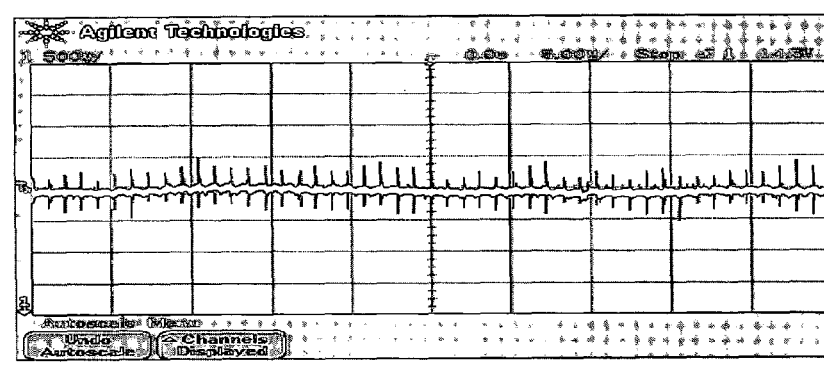
T-1-09
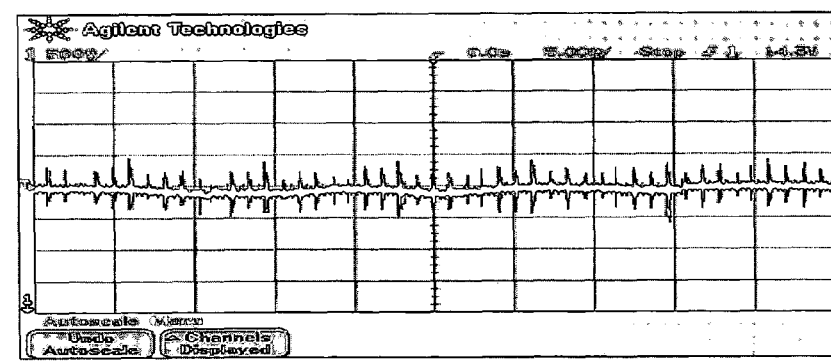
T-2-09
Attachment 11

Moving state full load voltage wave form:
Vehicle type : 1997,TOYOTO,CAMRY,2200CC
Measuring instrument : Agilent 54622D Mixed Signal Oscilloscope

| Engine running (full load) | | Voltage wave form between generator positive terminal and measuring point. | | | | | | | | |
|---|---|---|---|---|---|---|---|---|---|---|
| Measuring condition | | To negative terminal of generator (Attachment 13) | To negative terminal of battery (Attachment 14) | To negative terminal of starting motor (Attachment 15) | To negative terminal of throttle valve (Attachment 16) | To negative terminal of gear shift controller (Attachment 17) | To negative terminal of compressor (Attachment 18) | To negative terminal of ABS (Attachment 19) | To negative terminal of engine cover (Attachment 20) | To negative terminal of chassis (upper end of heat dissipator) (Attachment 21) |
| Without loop grounding wire | Idle speed | OL-1-01 | OL-1-02 | OL-1-03 | OL-1-04 | OL-1-05 | OL-1-06 | OL-1-07 | OL-1-08 | OL-1-09 |
| | 2000 rpm | OL-2-01 | OL-2-02 | OL-2-03 | OL-2-04 | OL-2-05 | OL-2-06 | OL-2-07 | OL-2-08 | OL-2-09 |
| With loop grounding wire | Idle speed | TL-1-01 | TL-1-02 | TL-1-03 | TL-1-04 | TL-1-05 | TL-1-06 | TL-1-07 | TL-1-08 | TL-1-09 |
| | 2000 rpm | TL-2-01 | TL-2-02 | TL-2-03 | TL-2-04 | TL-2-05 | TL-2-06 | TL-2-07 | TL-2-08 | TL-2-09 |

Attachment 12

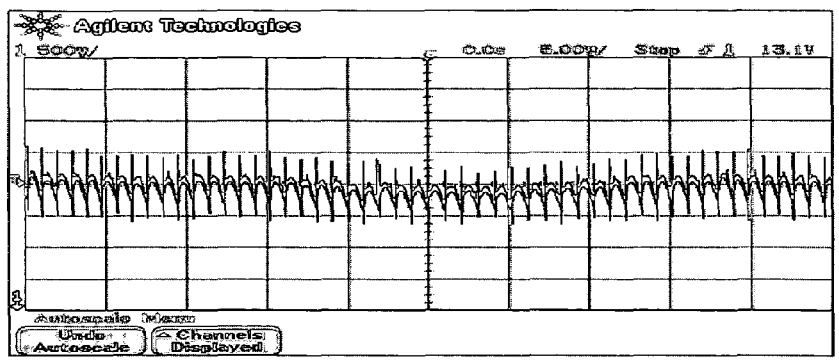
OL-1-01
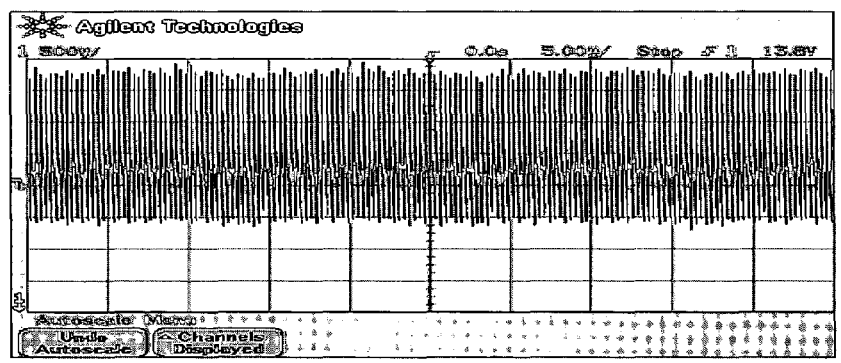
OL-2-01
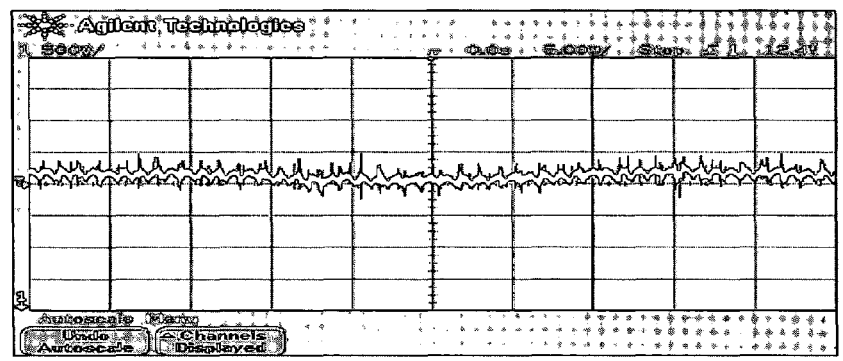
TL-1-01
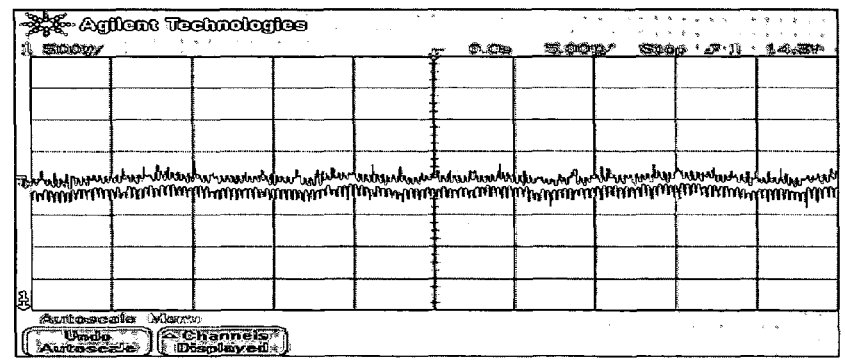
TL-2-01
Attachment 13

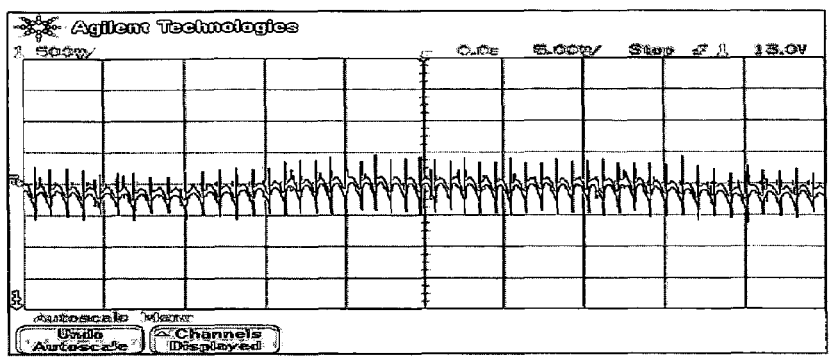
OL-1-02
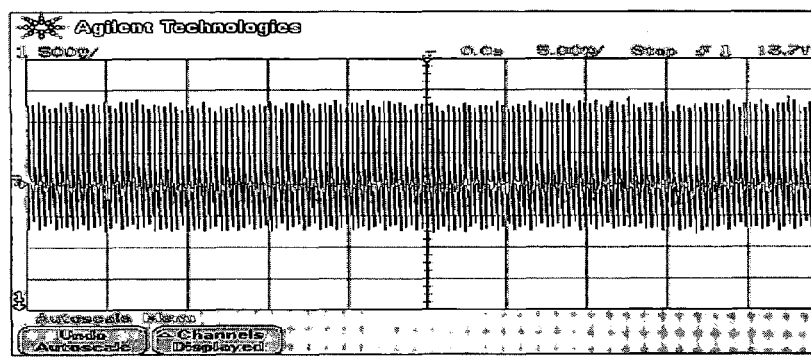
OL-2-02
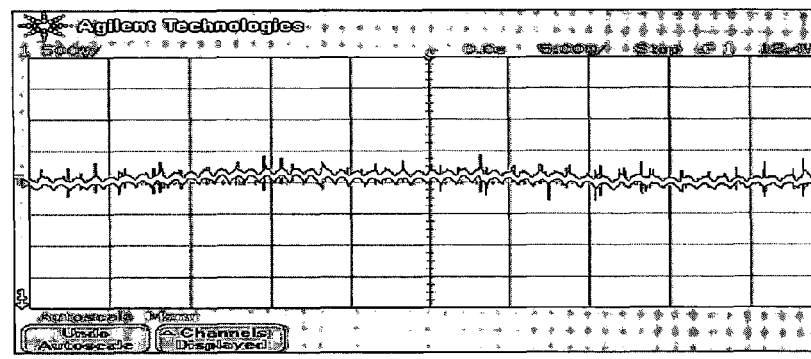
TL-1-02
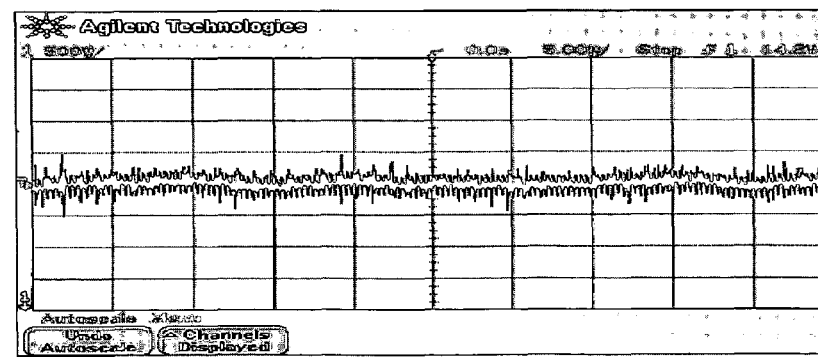
TL-2-02
Attachment 14

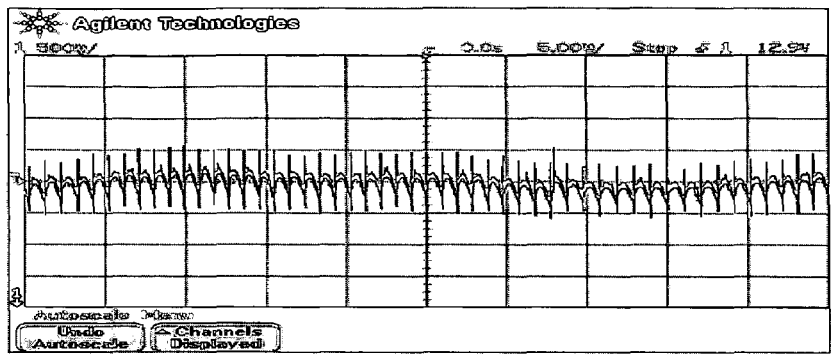
OL-1-03
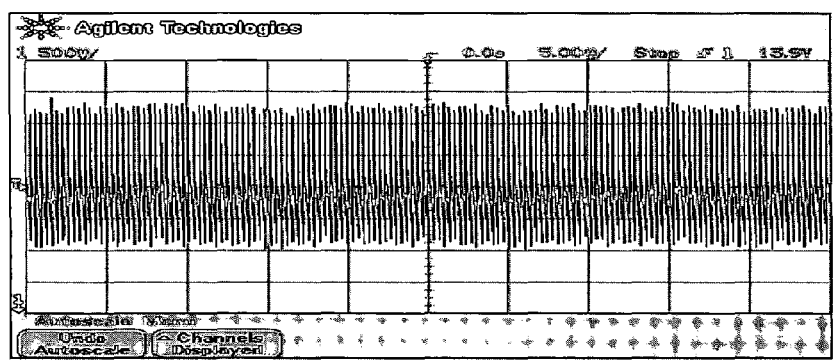
OL-2-03
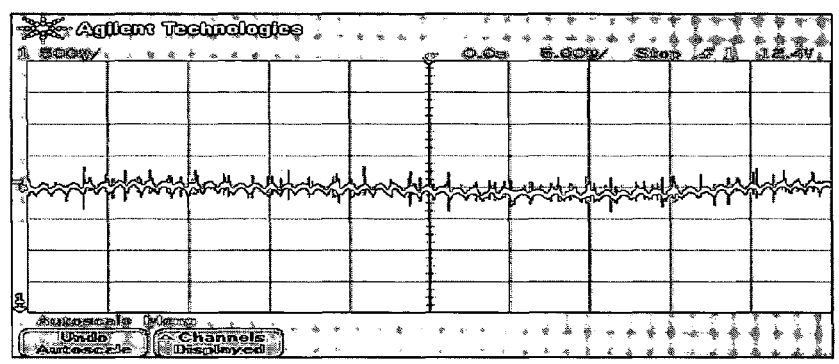
TL-1-03
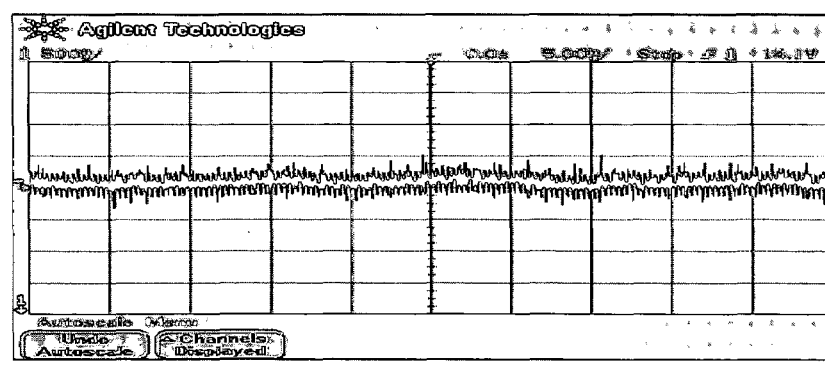
TL-2-03
Attachment 15

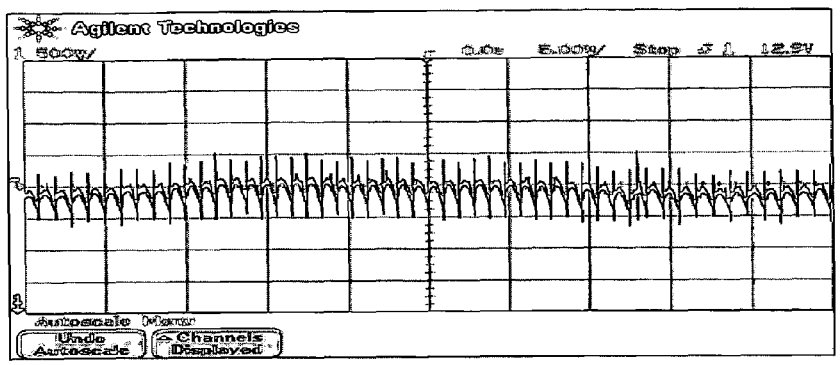
OL-1-04
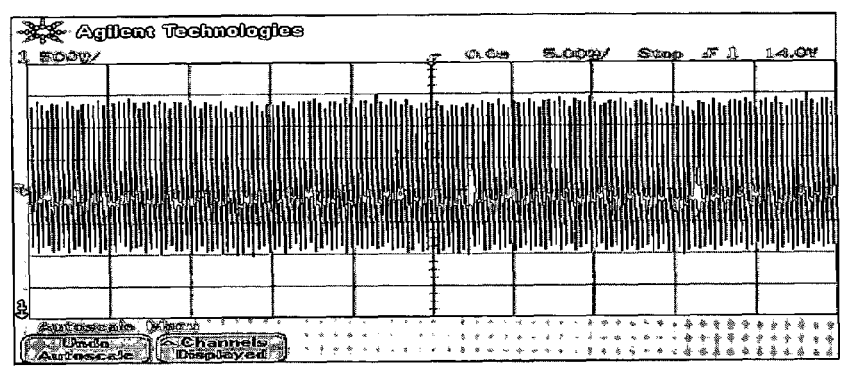
OL-2-04
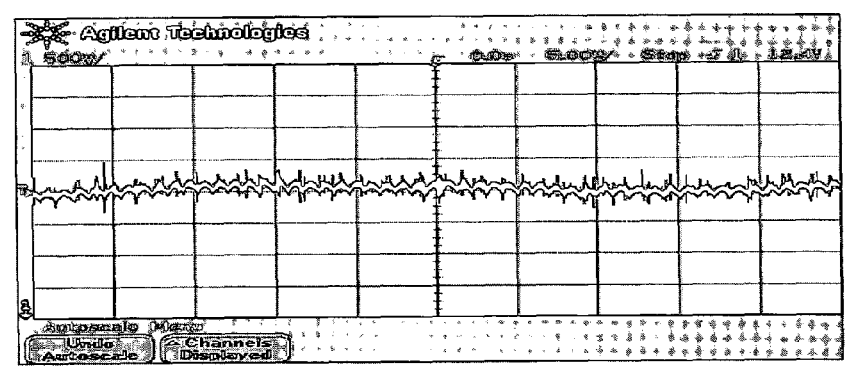
TL-1-04
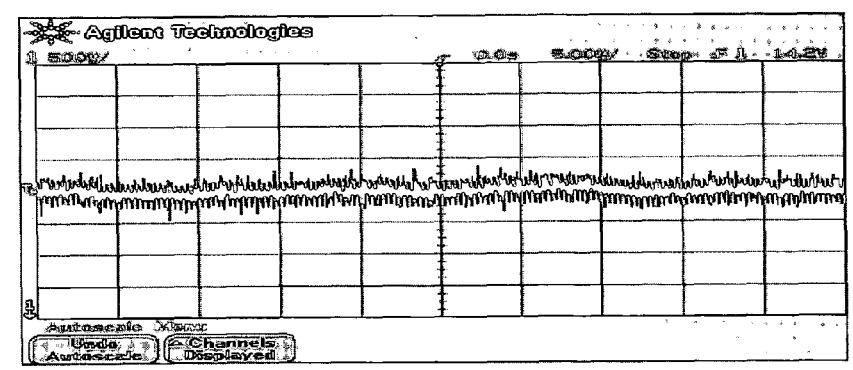
TL-2-04
Attachment 16

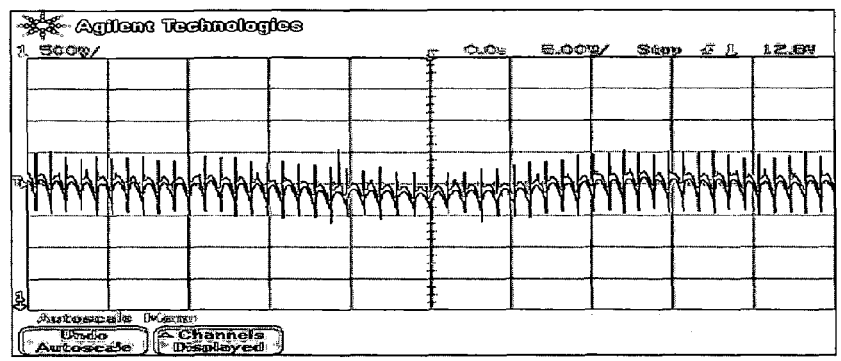
OL-1-05
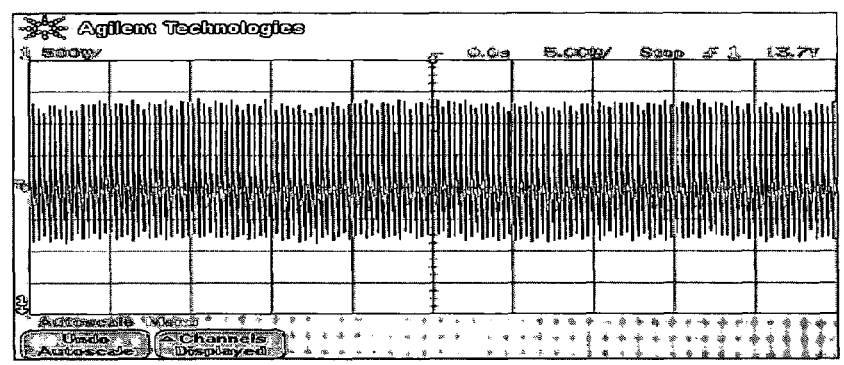
OL-2-05
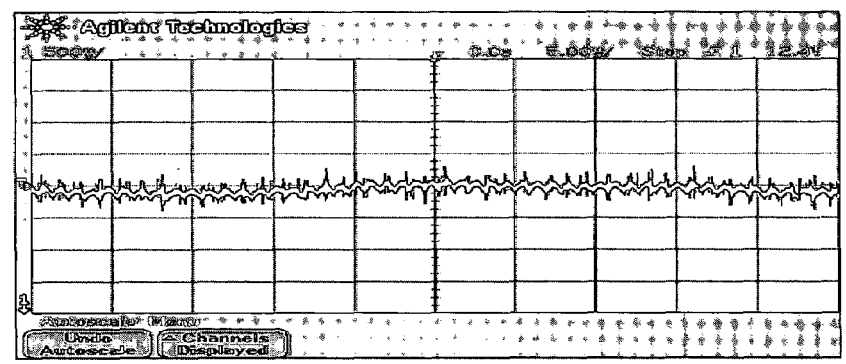
TL-1-05
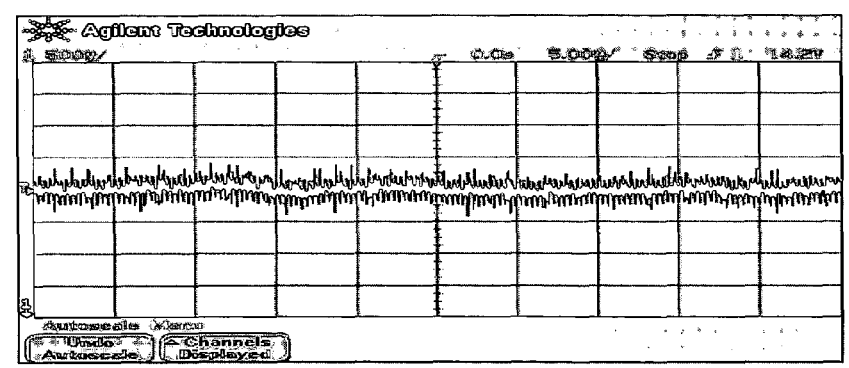
TL-2-05
Attachment 17

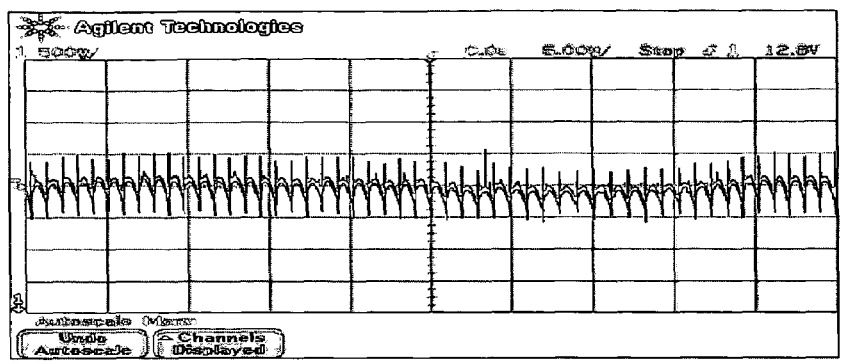
OL-1-06
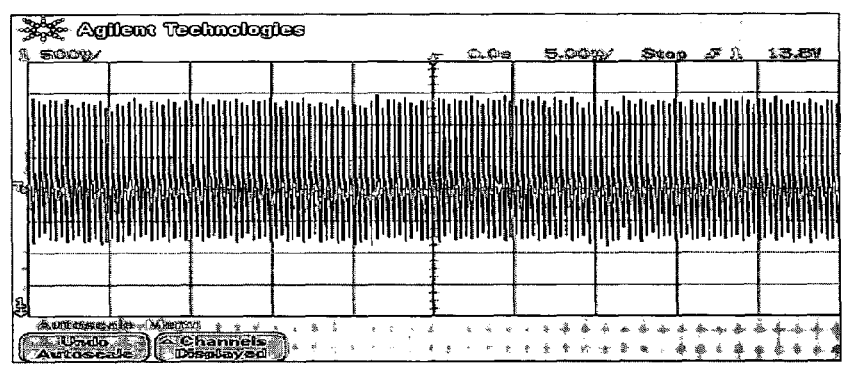
OL-2-06
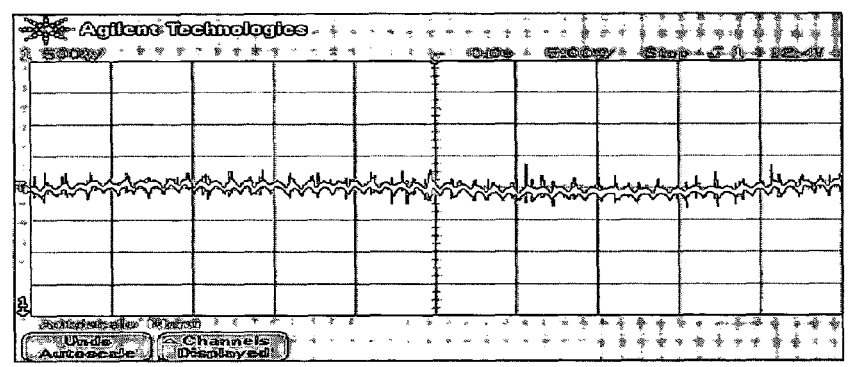
TL-1-06
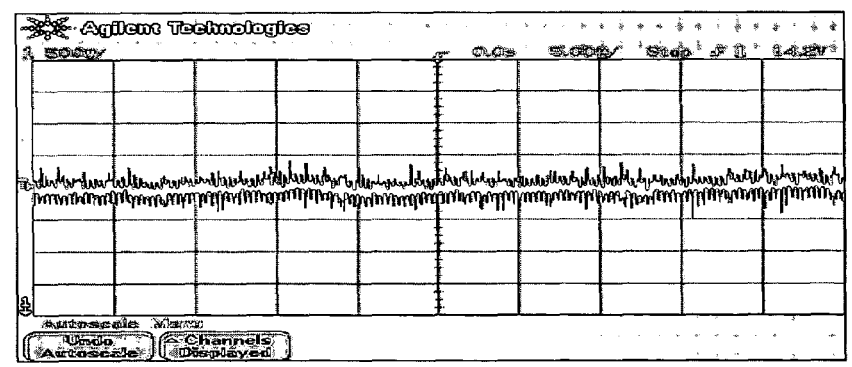
TL-2-06
Attachment 18

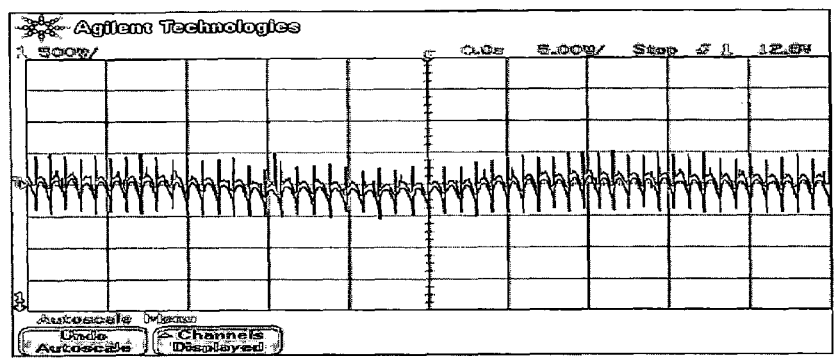
OL-1-07
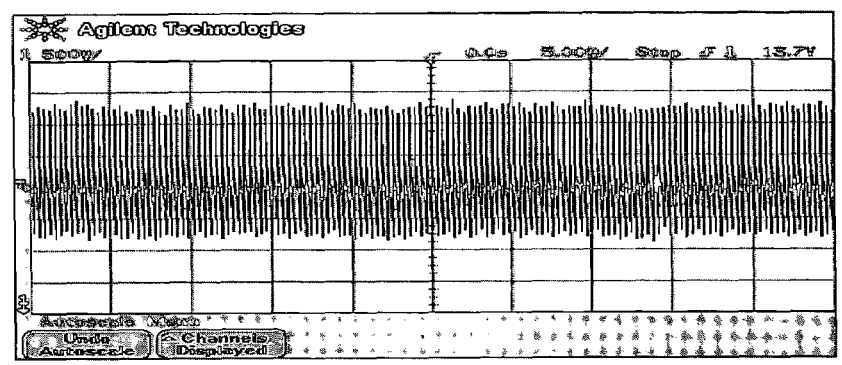
OL-2-07
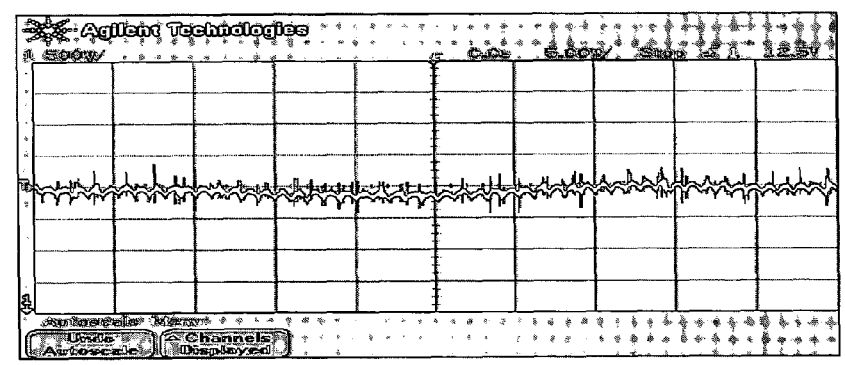
TL-1-07
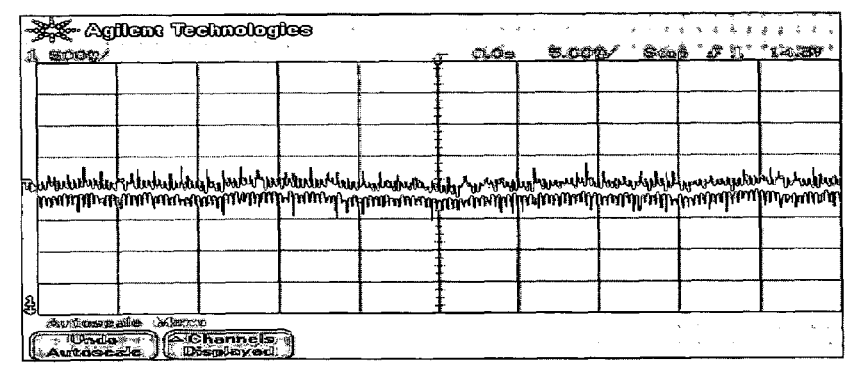
TL-2-07
Attachment 19

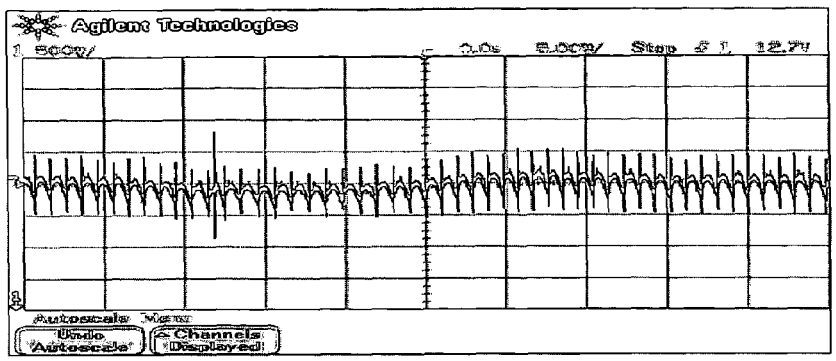
OL-1-08
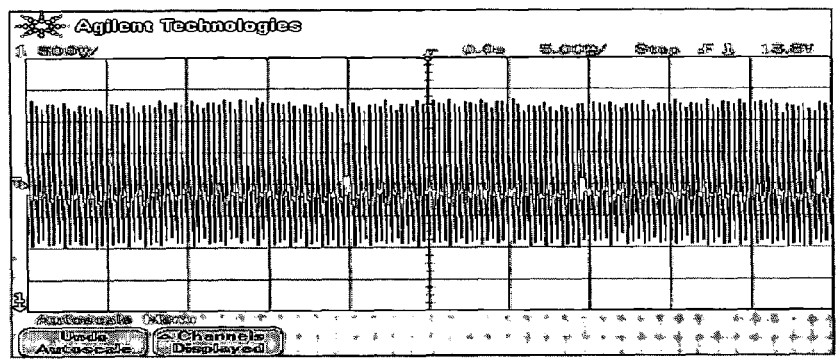
OL-2-08
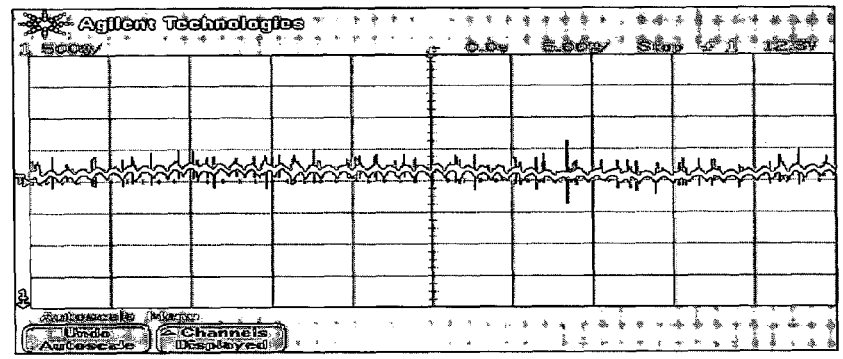
TL-1-08
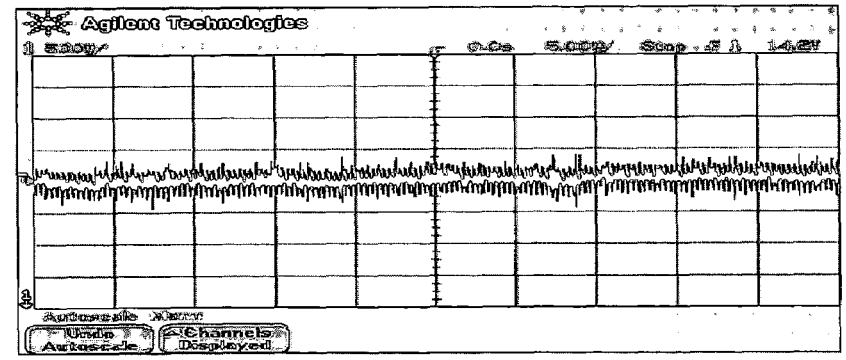
TL-2-08
Attachment 20

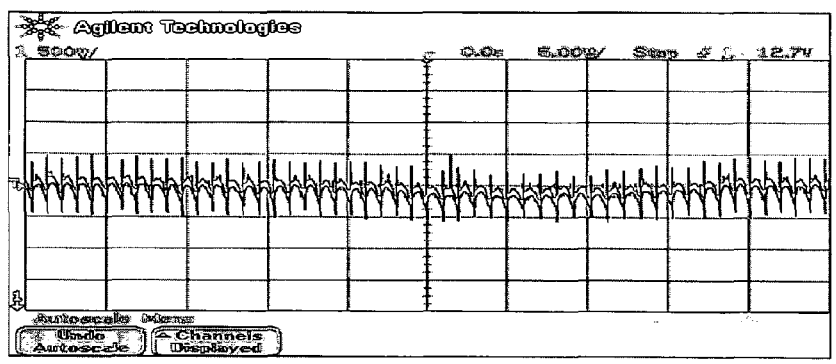
OL-1-09
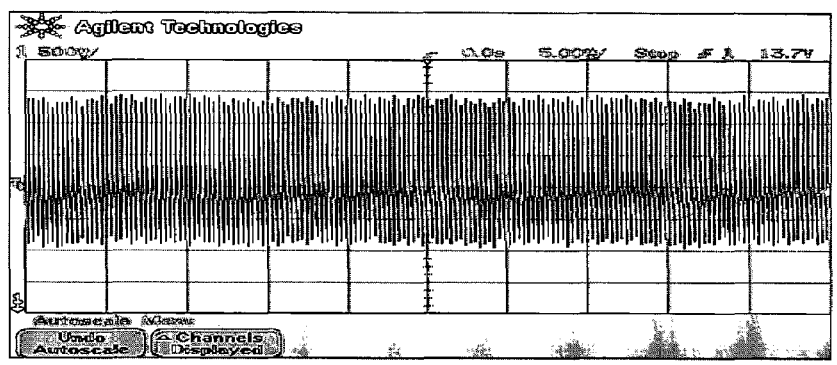
OL-2-09
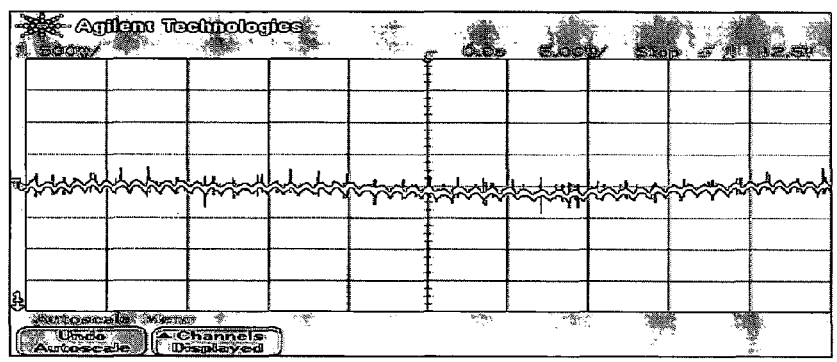
TL-1-09
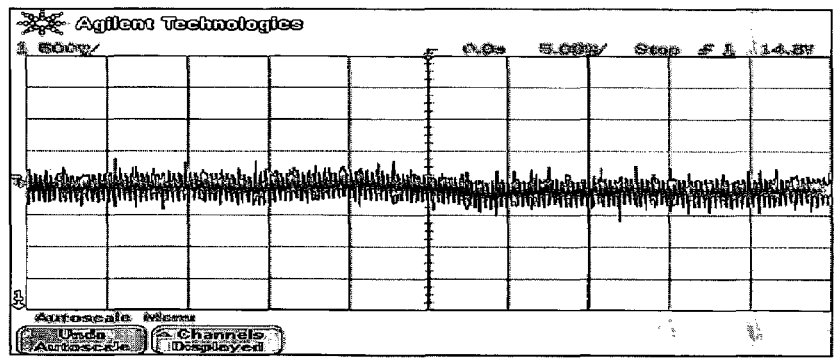
TL-2-09
Attachment 21

VOLTAGE STABILIZING AND SURGE PREVENTING VEHICLE GROUNDING SYSTEM

BACKGROUND OF THE INVENTION

1. Field of the Invention

The present invention relates to a voltage stabilizing and surge preventing vehicle loop grounding system, and more particularly, to a grounding system on which the essential components of the vehicle whose negative terminals being connected are protected from possible attack of electric surge and pulsating voltage of the generator by appropriate surge absorbing means, and the generator voltage is stabilized by effective grounding system.

2. Description of the Related Art

In keeping pace with the progress of automobile manufacturing technology, a lot of electronic products have been equipped in the automobile in order to improve its performance. As the electronic component is liable to yielding to the environmental conditions such as high ambient temperature and moisture resulting in varying its impedance and unabling to keep its signal level even generate multi functional signal or damage the connected electronic components.

The steel chassis of the automobile is to be used as the passage of grounding current. However its impedance will very following the change of temperature and time of service. This might cause variation of the input signal level to the automobile computer (ECU) from the sensor. Consequently, ECU may possibly send a malfunctional or an untimely signal to the control device thereby causing improper operation of the vehicle.

A malfunctional signal or an untimely signal may lead to incomplete conbustion of the engine owning to improper density of the vaporized fuel and produce pollutant exhausted gas. The surge current and pulsating voltage produce by the automobile generator will cause vibration and noise of D.C motors installed in the vehicle such as the fan motor and the refrigerator compressor. In the worst case, damage other electronic devices or radiate excessive electromagnetic wave.

Conventional energy saving means provided in the vehicle utilizes several sections of a specific magnetic wire to interconnect the nodes on the negative side return conductor so as to reduce the impedance of the electrical circuit. However, the electrical circuit of a vehicle so constructed has several noteworthy shortcomings that 1. The battery units is charged by the generator when the vehicle is moving, the grounding current is supplied from the negative side of the generator and not from the negative pole of the battery unit 2. The magnet wire used as a negative conductor may reduce the impedance of the circuit but at the same time, intensify the surge produced by the generator that greatly threats the insulation of other electronic devices provided in the vehicle such as the air flow sensor of the vehicle computer. 3. The lagging signal current carried in the magnet wire affects the coordinative action among the component devices in the vehicle electrical system, such as ignition timing, nozzle jet velocity etc., and lowers overall efficiency of the vehicle.

For these defects noticeable on the prior art, an improvement is seriously required.

The inventor has plunged into this matter for years to studying and improving these defects and come up with this invention, which is able to eliminate the defects mentioned above.

SUMMERY OF THE INVENTION

The present invention is to provide a vehicle loop grounding system capable of promoting vehicle efficiency and prolonging its lifetime by coordinating the action among the component devices in the vehicle electrical system by precisely adjusting the ignition time to obtain complete fuel combustion, sawing fuel consumption, increasing output power, and minimizing pollutant exhaust gas.

Another, the present invention is to provide a vehicle loop grounding system capable of stabilizing the generator voltage to reduce vibration and noise by forming an effective grounding system.

Still another, the present invention is to provide a vehicle loop grounding system capable of absorbing surge wave to protect the security of various electronic component devices and avoid radiation of excessive electromagnetic waves.

Still another, the present invention is to provide a vehicle loop grounding system capable of minimizing the impedance of the electrical circuit to assure prompt reaction of the safety bladder and intensity the brightness of the vehicle lights.

Accordingly, the vehicle loop grounding system is laid in the engine chamber, and is interconnecting the negative terminals of the generator, the gear shift controller, the engine cover, the battery unit, the starting motor, the anti stick brake motor, the vehicle computer, the throttle valve controller, the dash board, the compressor, the relay assembly, to the grounding terminal of the chassis so as to form a closed loop wire.

The devices provided with this closed loop grounding wire include a surge absorber having an accommodation cavity enclosed by a housing which is formed of two sections, an electrical circuit board contained inside has a positive and a negative conductor emerged out of the housing to form a circuit with a resistor, a fuse element, an indication lamp, and a plurality of capacitors. A surge suppresser has an accommodation cavity enclosed by an environment protective heat resistive plastic housing, the accommodation cavity is filled with an insulated environmental protective materials, and a plurality of successively arrayed annular magnetic hollow cores with an insulation electrical conductor wound around and passing through the channel formed by the hollow cores to extend out of the two ends of the surge suppresser thereby forming a first and a second conductors so as to be connected with the positive terminal of the surge absorber and the positive terminal of the compressor respectively.

The loop grounding wire is provided with nine nodes which being connected to the grounding points on the engine cover and the corresponding negative terminals of the component devices with one or more than one conductor.

BRIEF DESCRIPTION OF THE DRAWINGS

The drawings disclose an illustrative embodiment of the present invention, which serves to exemplify the various advantages and objects hereof, and are as follows.

Attachment 1 is a list enumerating the grounding resistances measured between the negative terminal of the generator and the negative terminals of various component devices with/without installing the loop grounding wire when vehicle engine stands still and the battery unit is disconnected. It is clear that the grounding resistances in every part are lowered when installing the loop grounding wire of the present invention.

Attachment 2 is a list enumerating the voltage wave form expressed in parameter words measured between the generator positive terminal and the negative terminals of various component devices with/without installing the loop grounding wire when vehicle engine is making no load running at idle speed and 2000 rpm.

Attachment 3 to 11 are oscilloscopic graphs of voltage wave forms taken respectively between the generator positive terminal and the negative terminals of the generator, the battery, the starting motor, the throttle valve, the gear shift controller, the compressor, the ABS, the engine cover, the chassis with/without installing the loop grounding wire when engine is making no load running at idle speed and 200 rpm.

Attachment 12 is a list enumerating the voltage wave form expressed in parameter words measured between the generator positive terminal and the negative terminals of various component devices with/without installing the loop grounding wire when vehicle engine is making full load running at idle speed and 2000 rpm.

Attachments 13 to 21 are oscilloscopic graphs of voltage wave forms taken respectively between the generator positive terminal and the negative terminals of the generator, the battery, the starting motor, the throttle valve, the gear shift controller, the compressor, the ABS, the engine cover, the chassis with/without installing the loop grounding wire when engine is making full load running at idle speed and 200 rpm.

DETAILED DESCRIPTION OF THE PREFERRED EMBODIMENT

Figure 5:
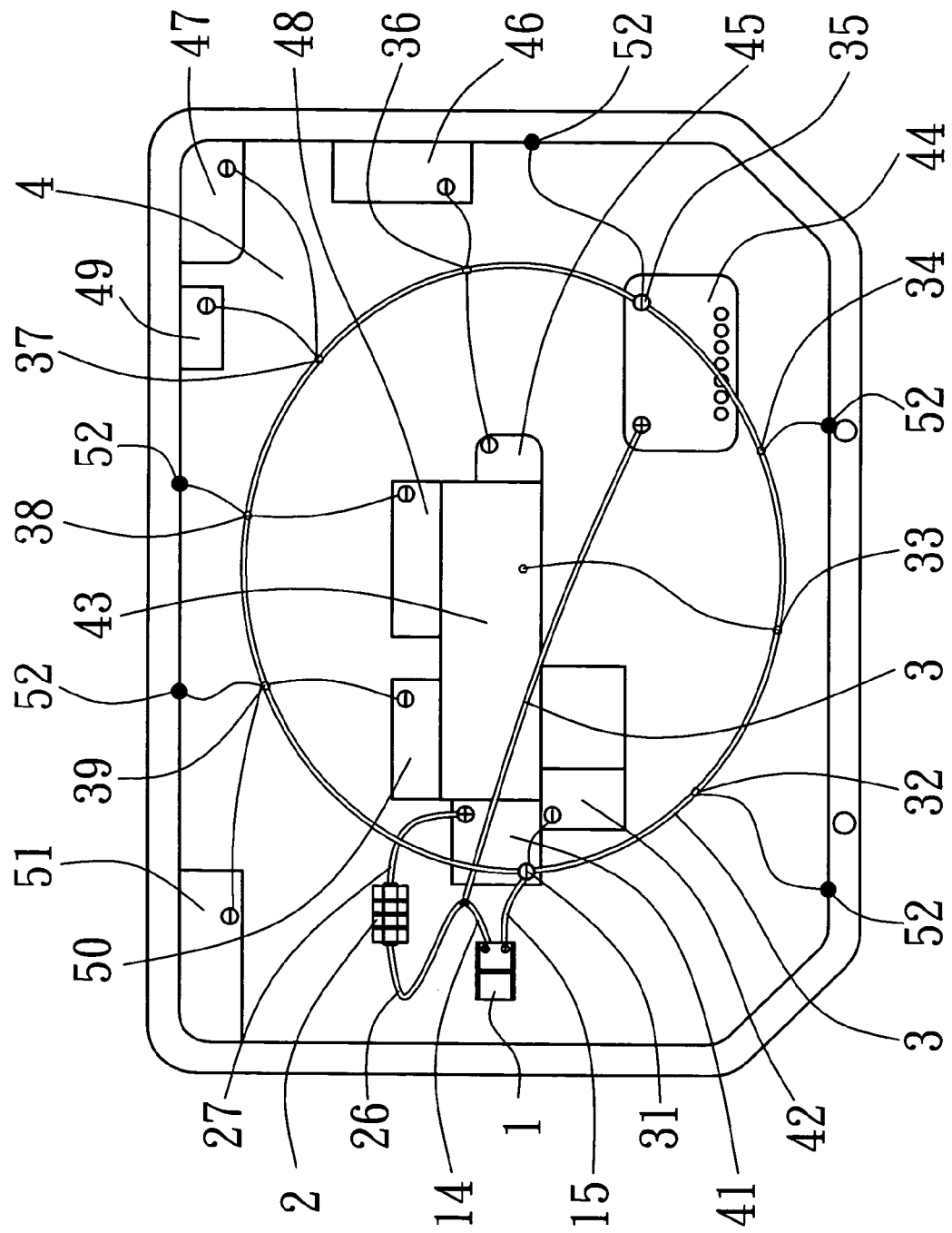
FIG. 5 is a wiring diagram of the vehicle loop grounding system according to the present invention.

Referring to FIG. 5, the wiring system of the present invention is laid in the vehicle engine chamber 4 so as not to affect the structural strength of the vehicle. The wire interconnects the negative terminal of a generator 41, the grounding terminal of a gear shift controller 42, an engine cover 43, the negative pole of a battery unit 44, the negative terminal of a starting motor 45, the negative terminal of ABS 46, the negative terminal of a vehicle computer 47, the negative terminal of a throttle valve 48, the grounding terminal of a dash board 49, the negative terminal of a compressor 50, the negative terminal of a relay assembly 51, and the grounding terminal of a chassis 52 so as to form a closed loop grounding wire. The functional devices joined to this loop are a surge absorber 1 and a surge suppresser 2, and a plurality of nodes are provided on the way of the loop wire in order to connect the aforementioned terminals with the loop wire. The positive conductor 14 of the surge absorber 1, a first conductor 26 of the surge suppresser 2 and the connector 3 connected to the positive pole of the battery unit 44 are connected together. A negative conductor 15 of the surge absorber 1 is connected to the negative terminal of the generator 41, while a second conductor 27 of the surge suppresser 2 is connected to the positive terminal of the generator 41.

By so, the closed loop grounding system is divided by nodes en route into several wiring sections. The first side goes counter clockwise beginning from a first node 31 which interconnects the negative terminal of generator 41 and the grounding terminal of gear shift controller 42, a second node 32 to which a first grounding terminal 52 of the chassis is connected, a third node 33 to which the grounding terminal 43 of the engine caver is connected, and ending at a fourth node 34 to which a second grounding terminal 52 of the chassis is connected.

The second side goes counter clockwise beginning from a fifth node 35 which interconnects the negative pole of the battery unit 44 and a third grounding terminal of the chassis, a sixth node 36 to which both the negative terminals of ABS 46 and the starting motor 45 are connected, a seventh node 37 to which the negative terminals of the vehicle computer 47 and the grounding terminal of the dash board 49 are connected, a eighth node 38 to which the grounding terminal of the throttle valve 48 and a fourth grounding terminal 52 of the chassis are connected, and ending at a ninth node 39 to which the grounding terminal of the compressor 50 and a fifth grounding terminal 52 of the chassis are connected.

Figure 4:
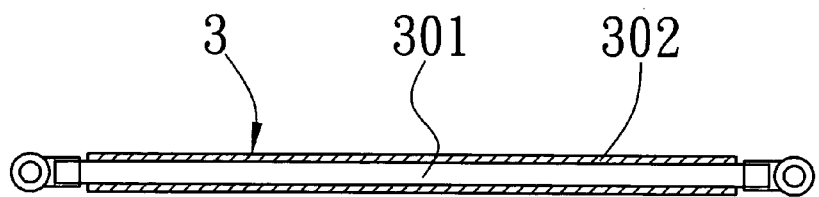
FIG. 4 is a schematic view of the grounding conductor used in the present invention.
Figure 8:
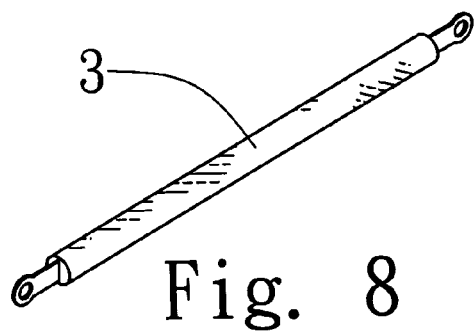

Referring to FIGS. 4 and 8, which show respectively the schematic and perspective views of the conductor used to construct the loop grounding system of the present invention. The conductor is formed of a high electric conductive core 301 sheathed with an insulation material 302.

Figure 1:
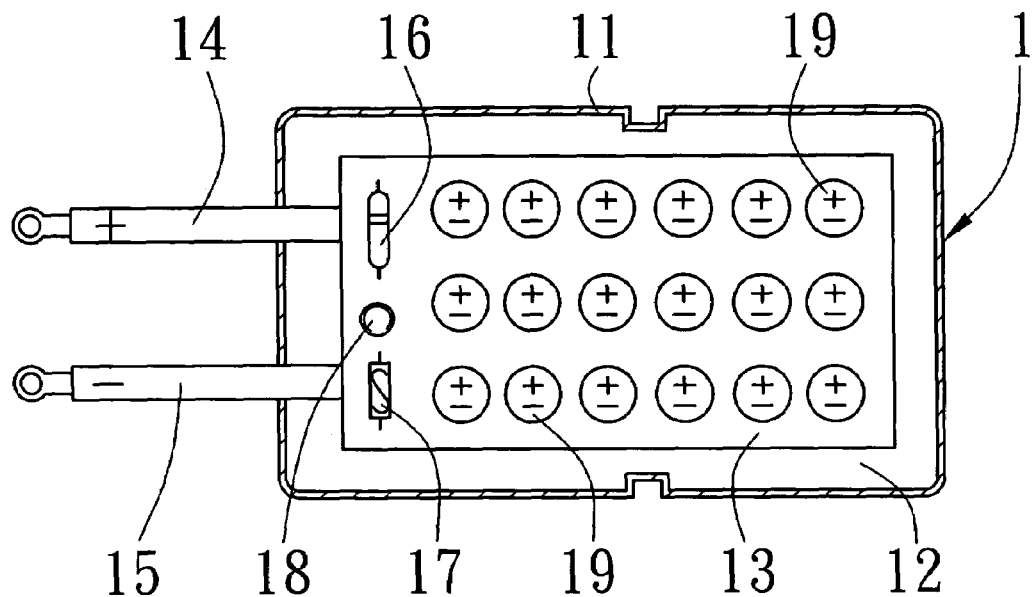
FIG. 1 is a cross sectional view of the surge absorber of the present invention.
Figure 2:
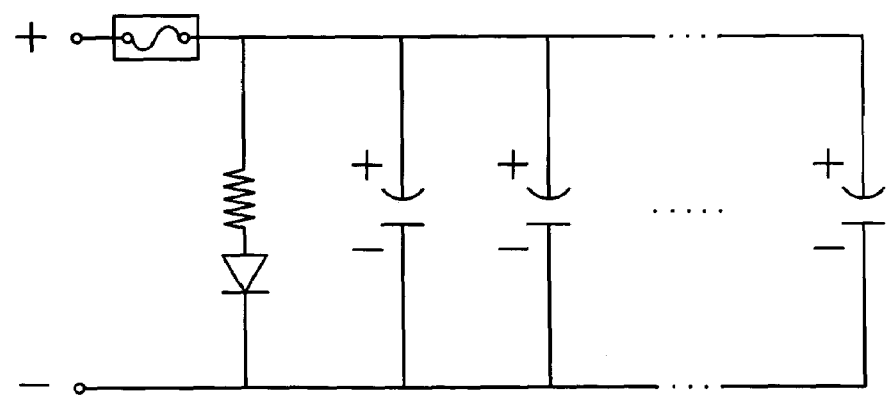
FIG. 2 is the wiring diagram of the surge absorber showing in FIG. 1.
Figure 6:
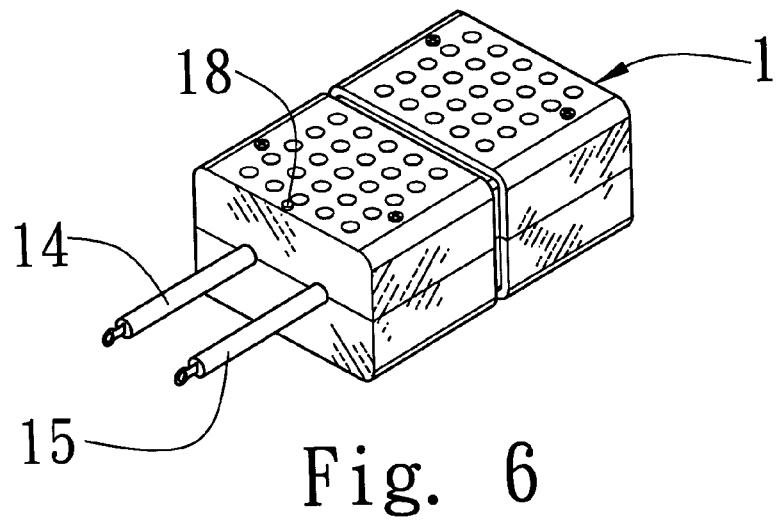
FIG. 6 to FIG. 8 show respectively the perspective views of the surge absorber, the surge suppresser, and the grounding conductor used in the present invention.

Referring to FIGS. 1 and 6, which show respectively the cross sectional and the perspective views of the surge absorber 1. The essential components of the surge absorber 1 are a resistor 16, a fuse element 17, an indication lamp 18, and a plurality of capacitor 19 disposed on an electrical circuit board 13 which is accommodated in an inner cavity 23. The inner cavity 12 is enclosed by a housing 11 composed of two sub-housings. Two lead wires 14 and 15 are extended out of the housing 11 from same side, and are respectively connected to the positive and negative terminals of the surge absorber 1. The resistor 16 is used to control the voltage and current of the indication lamp 18, and the fuse element 17 is for overcurrent protection of the surge absorber 1 and other components as well. The indication lamp 18 indicates whether the surge absorber 1 is energized. The wiring diagram of the surge absorber is shown in FIG. 2.

Figure 3:
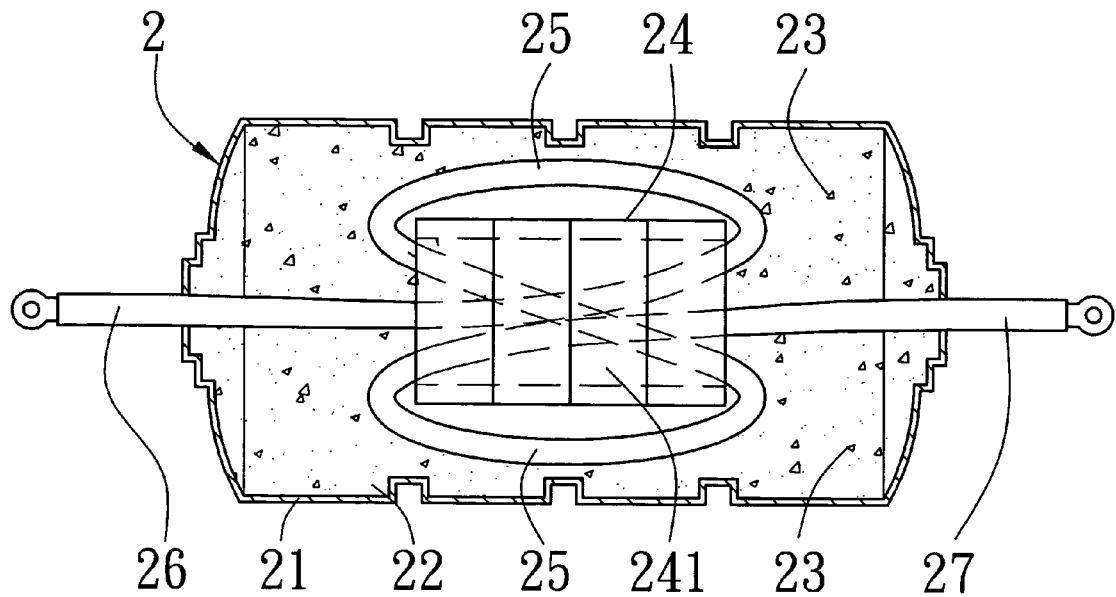
FIG. 3 is a cross sectional view of the surge suppresser of the present invention.
Figure 7:
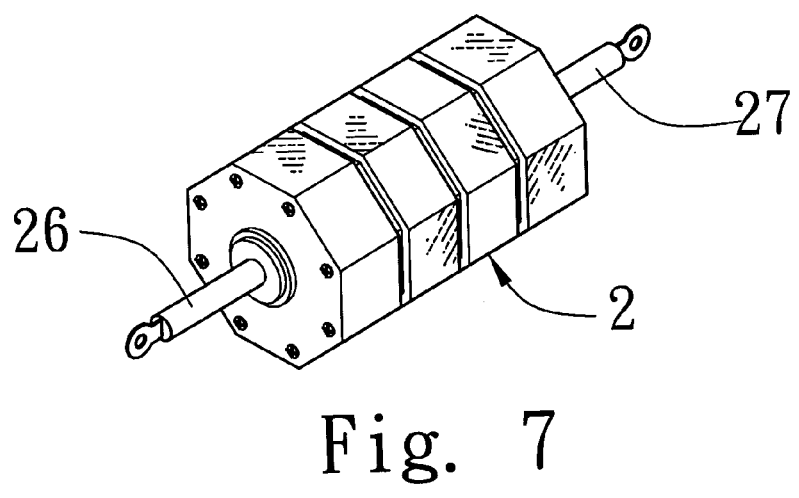

FIGS. 3 and 7 show respectively the cross sectional and the perspective views of surge suppresser 2 it is essentially a hollow annular magnetic core 24 formed of several successively arrayed sub-cores in an inner cavity 22 of an environmental protective heat resistive plastic housing 21, and an insulated electric conductor 25 coiling around the annular magnetic core 24 and passing the central passage 241 formed by the hollow portion of the magnetic core 24, is extended out of the surge suppresser 2 from both sides of the housing 21 respectively with a first and a second lead wires 26 and 27. Besides, the inner cavity 22 in the housing 21 is filled with an insulated environmental protective material 23 the surge suppresser 2 serves to suppress the surge current produced by the generator 41 so as to protect the other component devices form possible damage and minimize the intensity of harmful electromagnetic wave.

For laying out the loop grounding wire shown in FIG. 5, the following steps are followed:

(A) connecting the negative terminal of the surge absorber 1 to the negative terminal of the generator 41 with its negative conductor 15;

(B) connecting the second conductor 27 of the surge suppresser 2 to the positive terminal of the generator 41;

(C) connecting the positive conductor 15 of the surge absorber 1, the first conductor 26 of the surge suppresser 2, and the conductor 3 from the positive pole of the battery unit 44 together;

(D) using two conductors 3, each from one side to connect the negative terminal of the generator 41 and the negative pole of the battery unit 44, so as to form a closed loop grounding wire;

(E) connecting the negative terminal of the gear shift controller 42 to the first node 31 of the loop grounding wire using at least one conductor 3;

(F) connecting all of the nodes to the corresponding grounding terminals 52 with conductors 3;

(G) connecting the grounding terminal of the engine cover 43 to the third node 33 of the loop grounding wire using at least one conductor 3;

(H) connecting the negative terminal of ABS 46 to the sixth node 36 of the loop grounding wire using at least one conductor 3;

(I) connecting the negative terminal of the starting motor 45 to the sixth node 36 of the loop grounding wire using at least one conductor 3;

(J) connecting the negative terminal of the vehicle computer 47 to the seventh node 37 of the loop grounding wire using at least one conductor 3;

(K) connecting the common grounding terminal of the dash board 49 to the seventh node 37 of the loop grounding wire using at least one conductor 3;

(L) connecting the negative terminal of the throttle valve 48 to the eighth node 38 of the loop grounding wire using at least one conductor 3;

(M) connecting the negative terminal of the compressor 50 to the ninth node 39 of the loop grounding wire using at least one conductor 3;

(N) connecting the negative terminal of the relay assembly 51 to the ninth node 39 of the loop grounding wire; and (O) completing a multi-tapped loop grounding system.

In all, it emerges from the above description that the voltage stabilizing and surge preventing vehicle grounding system provided by the invention has several noteworthy features which serve to palliate the shortcomings of the vehicle grounding system system provided according to the prior art, namely:

(1) A reliable grounding contribute to lowering the grounding resistance of the mechanical components and stabilizing the output voltage of the vehicle generator that leads to helping engine have a timely ignition thereby making perfect combustion of fuel, increasing engines power output, saving fuel consumption, and clearing the pollutant exhaust gas.

(2) Alleviates, the vehicle vibration and diminishes the mechanical noise.

(3) Installation of surge absorber and surge suppresser protects the mechanical components from being damaged by impulse voltage.

(4) An excess radiation of the electromagnetic wave from the vehicle generator is prevented.

(5) Other advantages such as effective function of ABS, improved vehicle illumination, enhanced response of the security bladder.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A voltage stabilizing and surge preventing vehicle grounding system being laid in an engine chamber interconnecting a negative terminal of a vehicle generator, a gear shift controller, an engine cover, a battery unit, a starting motor, an antistick brake motor (ABS), a vehicle computer, a throttle valve, a dash board, a compressor, a relay assembly respectively to a grounding terminal of a chassis so as to form a closed loop wire;

a device provided with the closed loop grounding wire including:

a surge absorber having an accommodation cavity enclosed by a housing formed of two sections, an electrical circuit board contained inside has a positive and a negative conductor emerged out of the housing to form a circuit with a resistor, a fuse element, an indication lamp, and a plurality of capacitors;

a surge suppresser having an accommodation cavity enclosed by an environmental protective heat resistive plastic housing filled with an insulated environmental protective material, and a plurality of successively arrayed annular magnetic hollow cores with an insulation electrical conductor wound around and passing through the channel formed by said hallow cores to extend out of two ends of the surge suppresser thereby forming a first and a second conductors; and a multi-tapped closed loop grounding wires provided with nine nodes thereon.

2. The grounding system as in claim 1, wherein a negative terminal of the surge absorber is connected to a negative terminal of the vehicle generator with a conductor, while a positive terminal of the vehicle generator is connected to the first conductor of the surge suppresser and a positive pole of the battery unit with a conductor, while the second conductor of the surge suppresser is connected to the positive terminal of the vehicle generator, the multi-tapped closed loop grounding wire is connected to the negative terminal of the vehicle generator and a negative pole of the battery unit using at least two conductors.

3. The grounding system as in claim 1, wherein the closed loop grounding wire is connected to the negative terminal of the gear shift controller with a conductor from a first node thereof.

4. The grounding system as in claim 1, wherein the closed loop grounding wire is connected to a first grounding terminal of the chassis with a conductor from a second node thereof.

5. The grounding system as in claim 1, wherein the closed loop grounding wire is connected to the engine cover with a conductor from a third node thereof.

6. The grounding system as in claim 1, wherein the closed loop grounding wire is connected to a second grounding terminal of the chassis with a conductor from a fourth node thereof.

7. The grounding system as in claim 1, wherein the closed loop grounding wire is connected to a third grounding terminal of the chassis with a conductor from a fifth node thereof.

8. The grounding system as in claim 1, wherein the closed loop grounding wire is connected to the negative terminals of the ABS and the starting motor with a conductor from a sixth node thereof.

9. The grounding system as in claim 1, wherein the closed loop grounding wire is connected to the negative terminals of the vehicle computer and the dash board with two conductors from a seventh node thereof.

10. The grounding system as in claim 1, wherein the closed loop grounding wire is connected to the grounding terminal of the throttle valve and a fourth grounding terminal of the chassis with a wire from a eighth node thereof.

11. The grounding system as in claim 1, wherein the closed loop grounding wire is connected to the grounding terminals of the compressor and the relay assembly, and a fifth grounding terminal of the chassis with a wire from a ninth node thereof.

* * * * *